US008491030B2

(12) United States Patent
Stroup et al.

(10) Patent No.: US 8,491,030 B2
(45) Date of Patent: Jul. 23, 2013

(54) COMBINATION TRAILER

(75) Inventors: Randy D. Stroup, Lewisport, KY (US); Benjamin J. Pritchett, Owensboro, KY (US)

(73) Assignee: First Class Services, Inc., Lewisport, KY (US)

( * ) Notice: Subject to any disclaimer, the term of this patent is extended or adjusted under 35 U.S.C. 154(b) by 151 days.

(21) Appl. No.: 13/046,056

(22) Filed: Mar. 11, 2011

(65) Prior Publication Data

US 2011/0222997 A1   Sep. 15, 2011

Related U.S. Application Data

(60) Provisional application No. 61/312,890, filed on Mar. 11, 2010.

(51) Int. Cl.
*B60P 7/02* (2006.01)

(52) U.S. Cl.
USPC .................................... 296/100.01

(58) Field of Classification Search
USPC ................. 296/100.01, 100.12, 105
See application file for complete search history.

(56) References Cited

U.S. PATENT DOCUMENTS

| | | | | |
|---|---|---|---|---|
| 1,263,759 A | * | 4/1918 | Hanaway | 135/88.09 |
| 1,538,384 A | * | 5/1925 | Crockett et al. | 296/102 |
| 1,613,273 A | * | 1/1927 | Telford | 296/105 |
| 1,827,059 A | * | 10/1931 | Woolcott | 296/105 |
| 1,863,957 A | * | 6/1932 | Woolcott | 296/105 |
| 2,465,621 A | * | 3/1949 | Wheeler | 280/762 |
| 3,168,345 A | * | 2/1965 | Roberts et al. | 296/100.14 |
| 4,252,363 A | * | 2/1981 | Rodrigue | 296/100.12 |
| 4,711,484 A | | 12/1987 | Tuerk et al. | |
| 4,801,171 A | * | 1/1989 | Weaver | 296/100.11 |
| 4,902,064 A | | 2/1990 | Tuerk et al. | |
| 5,026,109 A | | 6/1991 | Merlot, Jr. | |
| 5,080,423 A | | 1/1992 | Merlot et al. | |
| 5,125,713 A | * | 6/1992 | Willingham et al. | 296/98 |
| 6,250,233 B1 | * | 6/2001 | Luckring | 105/377.01 |
| 6,981,734 B2 | * | 1/2006 | Martin | 296/100.12 |
| 7,210,726 B2 | | 5/2007 | Merlot, Jr. et al. | |
| 7,296,842 B2 | * | 11/2007 | Growcock et al. | 296/100.01 |
| 7,797,867 B2 | * | 9/2010 | Pulliam | 40/603 |
| 8,220,859 B2 | * | 7/2012 | Reeder et al. | 296/98 |
| 2002/0033615 A1 | * | 3/2002 | Henning | 296/98 |

FOREIGN PATENT DOCUMENTS

CA   2026344   12/1999

\* cited by examiner

*Primary Examiner* — H Gutman
(74) *Attorney, Agent, or Firm* — Stites & Harbison PLLC; Terry L. Wright

(57) ABSTRACT

A combination trailer is provided that includes a rear self-discharge trailer having a bottom surface, a front portion, a back portion, and two opposing side panels. The side panels of the combination trailer have a height that is less than the height of the front portion. An enclosure system is also included in the combination trailer and selectively covers an open top of the rear self-discharge trailer. One or more one locking pin assemblies are also included in the combination trailer and are attached to at least one of the side panels of the rear self-discharge trailer such that the locking pin assemblies can be used to secure the enclosure system in a desired position.

17 Claims, 12 Drawing Sheets

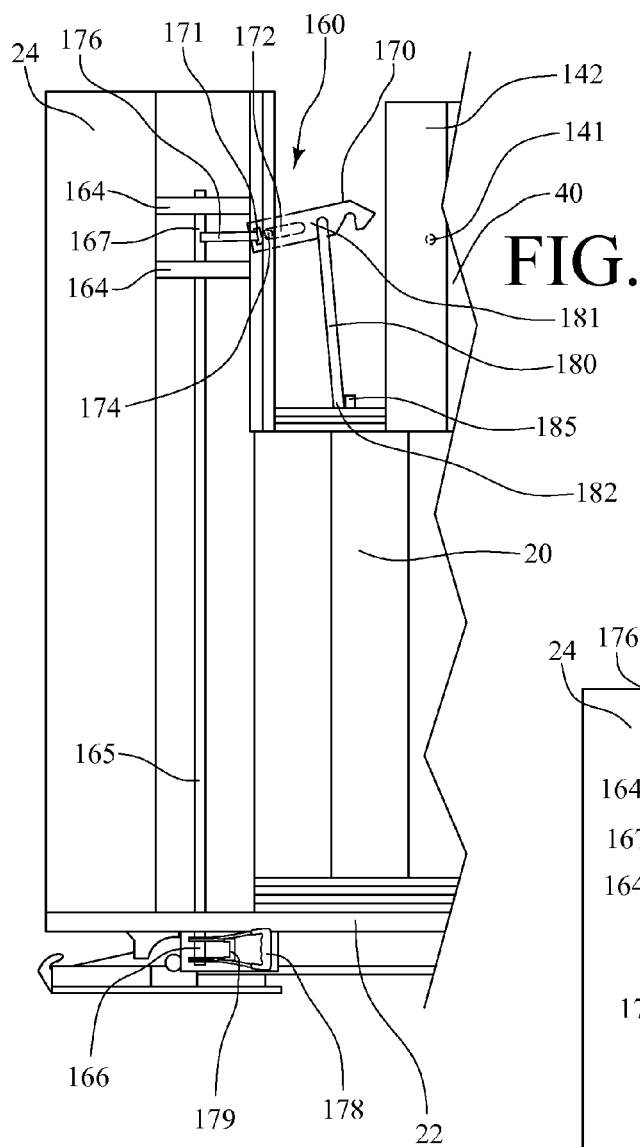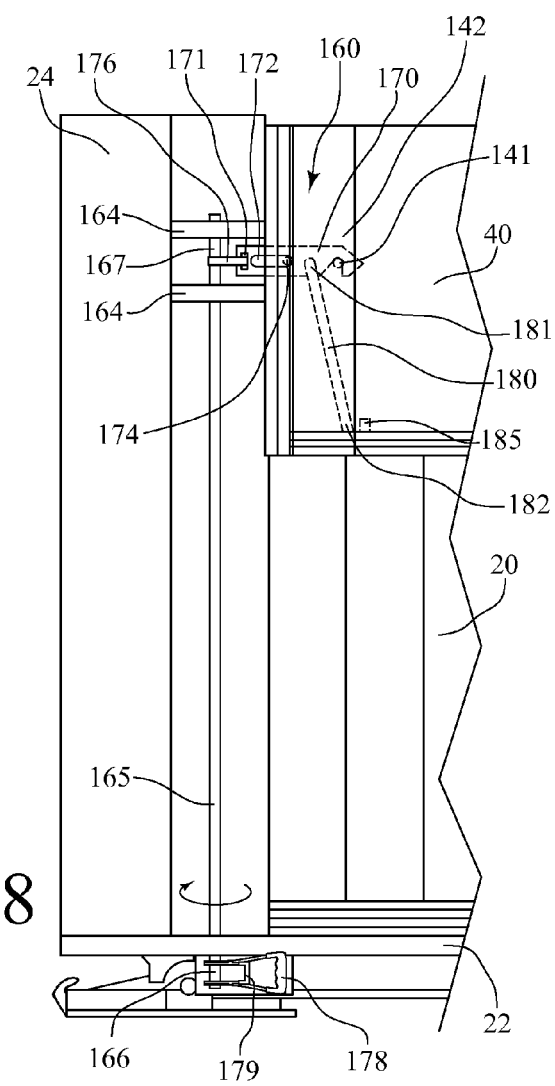

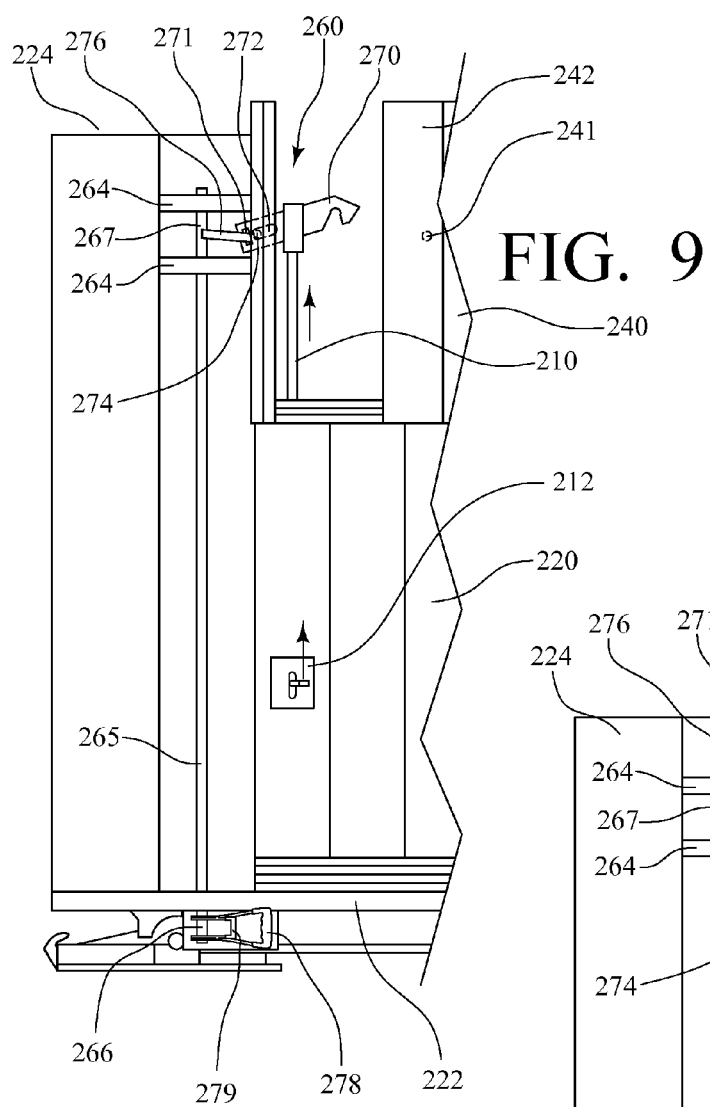
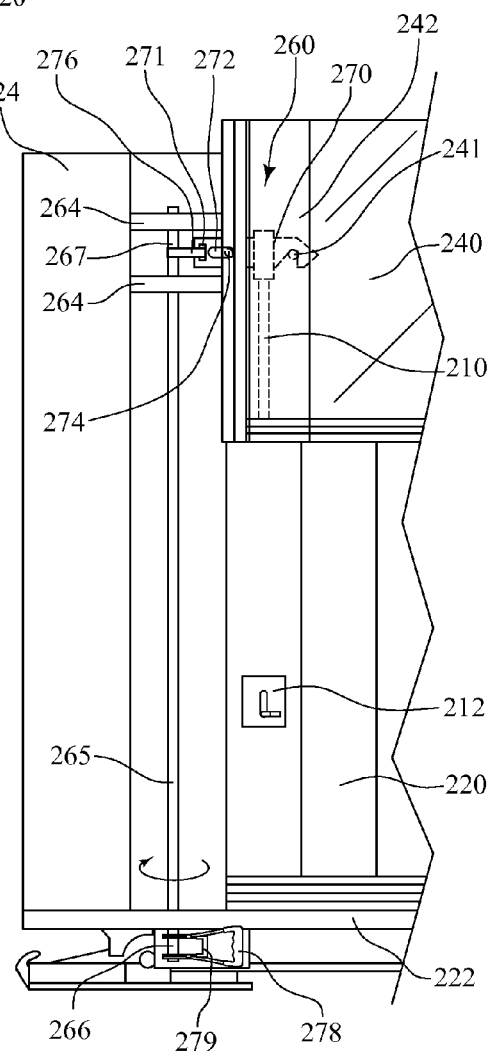
FIG. 9
FIG. 10

COMBINATION TRAILER

RELATED APPLICATIONS

This application claims priority from U.S. Provisional Application Ser. No. 61/312,890, filed Mar. 11, 2010, the entire disclosure of which is incorporated herein by this reference.

TECHNICAL FIELD

The present invention relates to a combination trailer. In particular, the present invention relates to a combination trailer that includes a rear self-discharge trailer and an enclosure system, where the enclosure system covers an open top of the rear self-discharge trailer and is adapted to be secured in various positions along the length of the rear self-discharge trailer by one or more locking pin assemblies.

BACKGROUND

In transporting commodities from one location to another with trailers, rear self-discharge trailers are typically utilized to transport bulk commodities, such as sand, coal, and coke. However, rear self-discharge trailers are typically not utilized to transport general commodities as commodities must generally be loaded onto a rear self-discharge trailer by "dumping" the commodities over the side of trailer. As such, flat bed or other similar trailers are often utilized to transport general commodities, and these commodities are then tied down to the trailer for transport. One problem with simply tying down a load of commodities to a trailer, however, is that the load is exposed to the weather, which can damage the commodities. Additionally, road debris or other foreign objects are commonly thrown into the air by the trucks pulling the trailer, or the wheels of the trailers themselves, and can further damage the commodities that are being transported.

Recognizing the deleterious effects that may result from tying a load to a flat bed trailer, various enclosure systems have been developed to protect the loads from the weather or from the debris that can strike the load in transit. Some of these enclosure systems have involved simple designs, such as a tarp that is merely tied over the load and used to provide a protective barrier for the commodities. Other enclosure systems, however, are considerably more detailed. For example, U.S. Pat. No. 4,711,484 describes a tarp cover system for flat bed trailers that makes use of a number of inverted U-shaped bow members that are longitudinally extendable and can be used to cover the entirety of the flat bed of a trailer. When a trailer equipped with such a tarp cover system is loaded, the U-shaped members and the tarp can be pulled into a collapsed position for loading and, subsequently, the U-shaped members and the tarp can then be expanded such that the enclosure system covers and protects the load in transit.

Despite the advantages that may be obtained by employing an enclosure system in a flat bed trailer, current enclosure systems are still not suitable for transporting bulk commodities. For instance, the tarp cover system described in U.S. Pat. No. 4,711,484 could not be used to carry a load of coal as the portion of the tarp cover system attached to the flat bed trailer and the tarp itself would not provide the required mechanical strength for carrying such a load.

In any event, a trailer has yet to be designed that combines the utility and beneficial properties of a rear self-discharge trailer with the utility and beneficial properties of a flat bed trailer covered with an enclosure system, such that a trailer can be provided that not only protects a load of commodities from the weather and various debris, but also is capable of carrying bulk commodities such as coal.

SUMMARY

The present invention is a combination trailer that combines a rear self-discharge trailer with an enclosure system such that the enclosure system covers an open top of the rear self-discharge trailer and is adapted to be secured in various positions along the length of the rear self-discharge trailer by one or more locking pin assemblies. Thus, the combination trailer of the present invention combines the utility and beneficial properties of a rear self-discharge trailer with the utility and beneficial properties of a flat bed trailer covered with an enclosure system.

In one exemplary embodiment, a combination trailer is provided that includes a rear self-discharge trailer having a bottom surface, a front portion, a back portion, and two opposing side panels, where the side panels have a height that is less than the height of the front portion of the rear self-discharge trailer (e.g., a height that is about one-half of the height of the front portion of the rear self-discharge trailer). The combination trailer further includes an enclosure system that is adapted to selectively cover an open top of the rear self-discharge trailer. Furthermore, the combination trailer includes at least one locking pin assembly that is attached to one of the side panels of the rear self-discharge trailer such that the locking pin assembly can be used to secure the enclosure system in a desired position.

The enclosure system of the presently-described combination trailer includes a pair of longitudinal guide tracks, which are secured to the opposing side panels of the rear self-discharge trailer, and a plurality of inverted U-shaped members. Each U-shaped member includes a horizontal portion that is substantially parallel to the bottom surface of the rear self-discharge trailer and a pair of vertical leg portions that extend downward from the horizontal portion and terminate adjacent to the guide tracks. A means for connecting the vertical leg portions to the longitudinal guide tracks, such as a carrier, secures the vertical leg portions to the longitudinal guide tracks and is typically adapted for sliding movement relative to the guide tracks such that the U-shaped members are capable of being displaced between an expanded condition and a collapsed condition. Finally, to complete the enclosure system, a flexible tarp is placed on and extends over the plurality of inverted U-shaped members to cover the open top of the trailer.

To further obtain some of the benefits associated with a rear self-discharge trailer, an exemplary combination trailer further includes a tailgate that is pivotally connected to at least one of the side panels of the trailer and extends to a height that is substantially equal to the height of the opposing side panels of the rear self-discharge trailer. In such embodiments, the rear section of the enclosure system further includes a rear door cover that extends from the top of the enclosure system to the top of the tailgate to fully enclose the back of the combination trailer, while still allowing for easy access to the interior of the trailer.

As noted above, to secure the enclosure system in a desired position along the length of the rear self-discharge trailer, an exemplary combination trailer typically includes one or more locking pin assemblies along the length of at least one side panel of the trailer. For example, in certain embodiments, the rear self-discharge trailer includes a pair of locking pin assemblies at a front end of each side panel, a pair of locking pin assemblies at a back end of each side panel, and one or more locking pin assemblies along the length of at least one side panel such that the vehicle operator can readily access the locking pin assemblies and position the enclosure system at a desired location on the combination trailer.

Regardless of the particular location of the locking pin assemblies, however, each locking pin assembly generally comprises a locking pin; a first bearing block and a second bearing block for securing the locking pin to the side panel; and a spring that surrounds the locking pin and is positioned between the first bearing block and a handle so as to bias the locking pin into engagement with the enclosure system and secure the enclosure system in a desired position. In this regard, the handle is attached to the locking pin and is positioned between the spring and the second bearing block such that downward movement of the handle compresses the spring and moves the locking pin in a downward direction to disengage the pin from the enclosure system and allow the enclosure system to be expanded or otherwise moved to a different position along the length of the rear self-discharge trailer.

To secure the front section of the enclosure system to the front portion of the rear-self-discharge trailer, the combination trailer of the present invention, in some embodiments, further includes a pair of latch assemblies that are attached to the front portion of the rear self-discharge trailer. In such embodiments, each latch assembly includes a means for securing the latch assembly to the front portion of the rear self-discharge trailer; and a rod having a lower portion that extends through the bottom surface of the rear self-discharge trailer and an upper portion received by the means for securing the latch assembly. A hooked arm, defining a central eyelet, is further included in the latch assembly, and a pin, positioned in the front portion of the rear self-discharge trailer, pivotally connects to the central eyelet of the hooked arm to attach it to the front portion of the trailer. A strap is also provided in each latch assembly and connects to the upper portion of the rod and a front eyelet in the hooked arm. Finally, a ratchet is also included as part of each latch assembly, and is connected to the lower portion of the rod such that the operation of the ratchet rotates the rod and causes the strap to wind around the rod. As the strap winds around the rod, the hooked arm subsequently engages an attachment pin in the front section of the enclosure system to thereby secure the enclosure system to the front portion of the rear self-discharge trailer. In certain embodiments, the ratchet of the latch assembly further includes a pawl for preventing movement by the enclosure system away from the front portion of the rear self-discharge trailer.

To facilitate the disengagement of the latch assembly from the attachment pin in the front section of the enclosure system, each latch assembly further typically comprises a sliding rod-like member. In these embodiments, the sliding rod-like member includes a first end that is attached to the hooked arm and a second end that is adapted for sliding movement along the top surfaces of the side panels of the rear self-discharge trailer. Upon contact with a stop block, which is also positioned on the top surfaces of the side panels of the rear self-discharge trailer, the sliding rod-like member biases the hooked arm in an upward direction and disengages the hooked arm from the front section of the enclosure system.

In some embodiments of an exemplary combination trailer of the present invention, means are also provided to secure the rear section of the enclosure system to the back portion of the rear self-discharge trailer. In some embodiments, the means for securing the rear section of the enclosure system to the back portion of the rear self-discharge trailer includes a lower drive sprocket; an upper driven pinion; a chain extending around the lower drive sprocket and the upper driven pinion; and a rack secured to the rear section of the enclosure system. In such embodiments, upon placement of the rack adjacent to the pinion, rotating the lower drive sprocket also rotates the upper drive pinion and moves the rack laterally to thereby close and secure the rear section of the enclosure system to the back portion of the rear self-discharge trailer. In some embodiments, the lower drive sprocket further includes a ratchet for rotating the lower drive sprocket and also includes a pawl that prevents the enclosure system from moving away from the back portion of the rear self-discharge trailer as the rear section of the enclosure system is being secured.

An exemplary combination trailer of the present invention can further include a number of features that are positioned in the interior of the self-discharge trailer. For example, in some embodiments, an exemplary combination trailer further comprises a pair of internal rails that are positioned on the bottom surface of the rear self-discharge trailer and connected to the opposing side panels of the rear self-discharge trailer by a plurality of posts, where each of the posts are spaced at a predetermined distance from each adjacent post. In some embodiments, the interior of the combination trailer further includes an adjustable bulkhead for securing a load in the rear self-discharge trailer, where the adjustable bulkhead includes a center panel that is secured between two opposing side members. In these embodiments, the side members of the adjustable bulkhead generally include a hooked bottom portion such that that hooked bottom portions of the adjustable bulkhead can be slidably disposed over the posts and the adjustable bulkhead can be positioned at a desired location in the rear self-discharge trailer.

Further features and advantages of the present invention will become evident to those of ordinary skill in the art after a study of the description, figures, and non-limiting examples in this document.

BRIEF DESCRIPTION OF THE DRAWINGS

FIG. 7 is a partial side view of the front portion of the exemplary combination trailer of FIG. 1, but showing the enclosure system pulled away from the front portion of trailer and showing the latch assembly attached to the front portion of the trailer;

FIG. 8 is a partial side view similar to FIG. 7, but showing the front section of the enclosure system secured to the front portion of rear self-discharge trailer and also showing the latch assembly engaging an attachment pin in the front section of the enclosure system;

FIG. 9 is a partial side view of the front portion of another exemplary combination trailer, and showing the enclosure system pulled away from the front portion of rear self-discharge trailer with another latch assembly attached to the front portion of the rear self-discharge trailer;

FIG. 10 is a partial side view similar to FIG. 9, but showing the enclosure system secured to the front portion of trailer and showing the other latch assembly engaging an attachment pin in the front section of the enclosure system;

DESCRIPTION OF EXEMPLARY EMBODIMENTS

Figure 1:
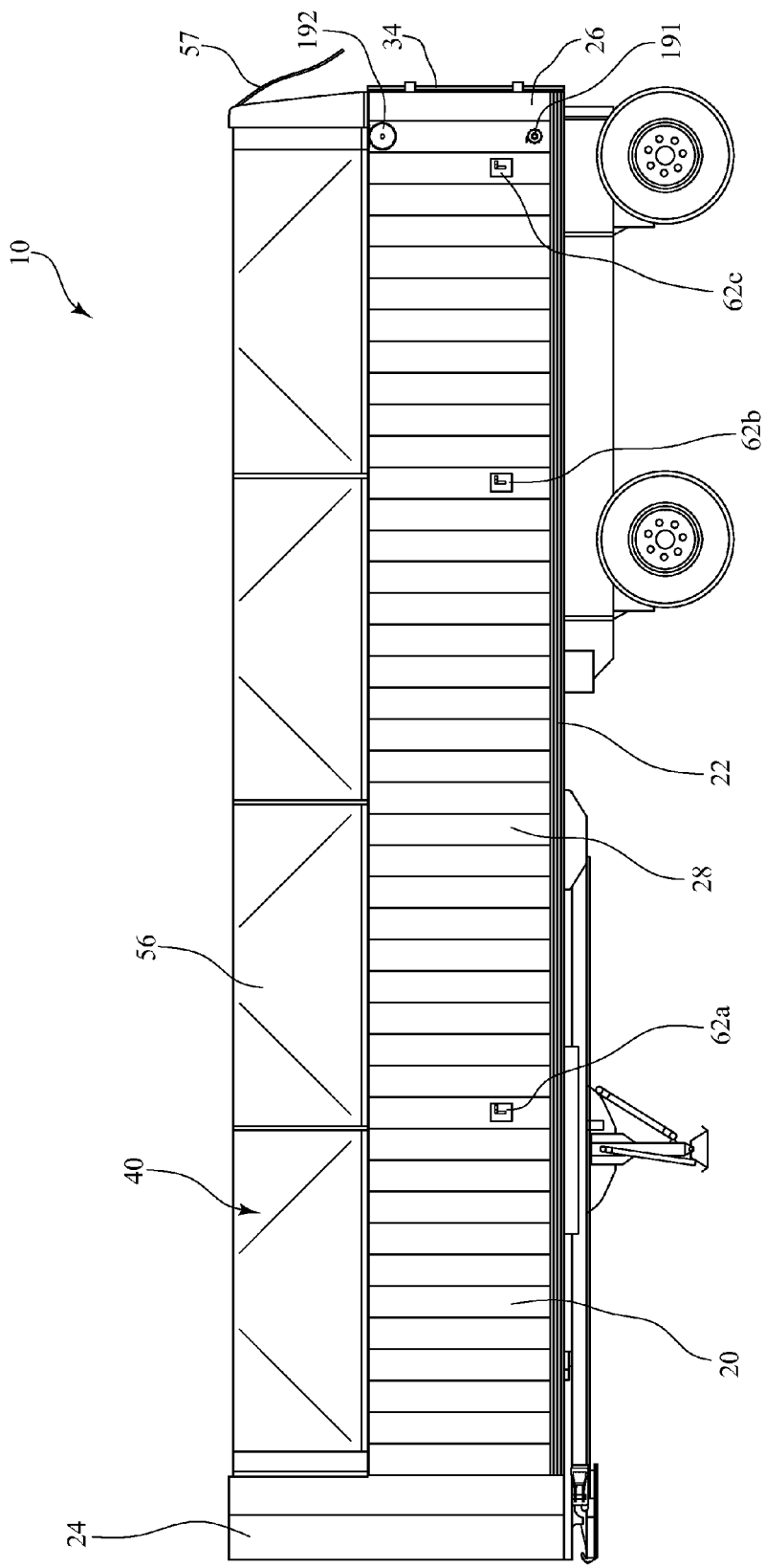
FIG. 1 is a side view of an exemplary combination trailer made in accordance with the present invention, and showing an exemplary enclosure system covering the open top of a rear self-discharge trailer.

The present invention is a combination trailer and, more particularly, a combination trailer that includes a rear self-discharge trailer and an enclosure system that covers an open top of the rear self-discharge trailer and is adapted to be secured in various positions along the length of the rear self-discharge trailer by one or more locking pin assemblies.

Referring first to FIGS. 1-3 and FIG. 11, an exemplary combination trailer 10 made in accordance with the present invention includes a rear self-discharge trailer 20 having a bottom surface 22, a front portion, 24, a back portion 26, and two opposing side panels 28, 30. The side panels 28, 30 have a height that is less than the height of the front portion 24 of the rear self-discharge trailer 20 such that, in some embodiments, the upper edge of the side panels 28, 30 only extends to a height that is about half of the height of the front portion 24 of the rear self-discharge trailer 20. Furthermore, the combination trailer 10 includes an enclosure system 40 adapted to cover an open top 32 of the rear self-discharge trailer 20. The combination trailer 10 additionally includes at least one locking pin assembly that is attached to one of the side panels 28, 30 of the rear self-discharge trailer 20 and is used to secure the enclosure system 40 in a desired position, as described in further detail below. In this exemplary embodiment, there are three such locking pin assemblies 62a, 62b, 62c attached to the side panel 28.

Figure 2:
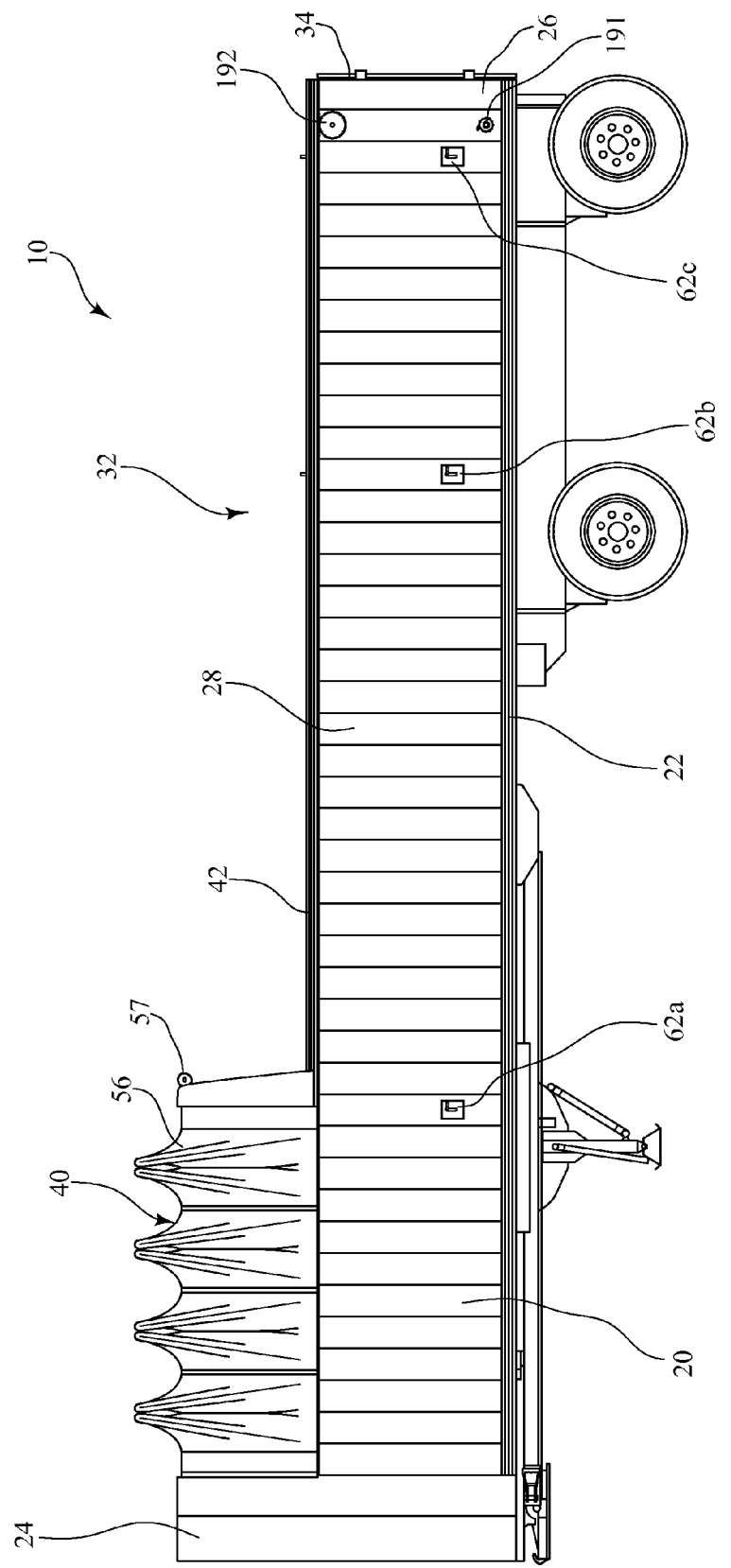
FIG. 2 is another side view of the exemplary combination trailer shown in FIG. 1, but showing the enclosure system in a collapsed position over a portion of the open top of the rear self-discharge trailer.
Figure 3:
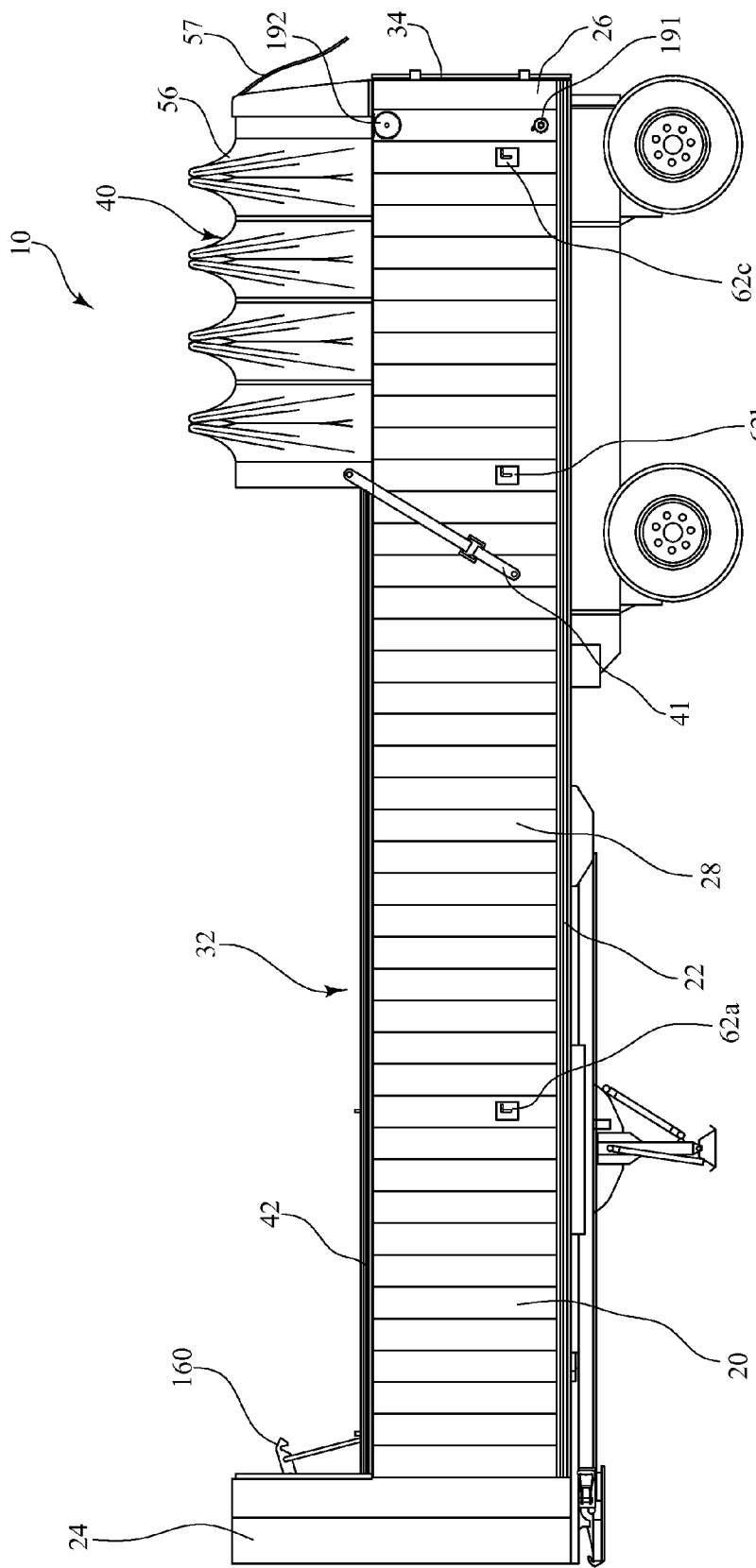
FIG. 3 is another side view of the exemplary combination trailer shown in FIG. 1, but showing the enclosure system in a collapsed position over a different portion of the open top of the trailer from that shown in FIG. 2.
Figure 12:
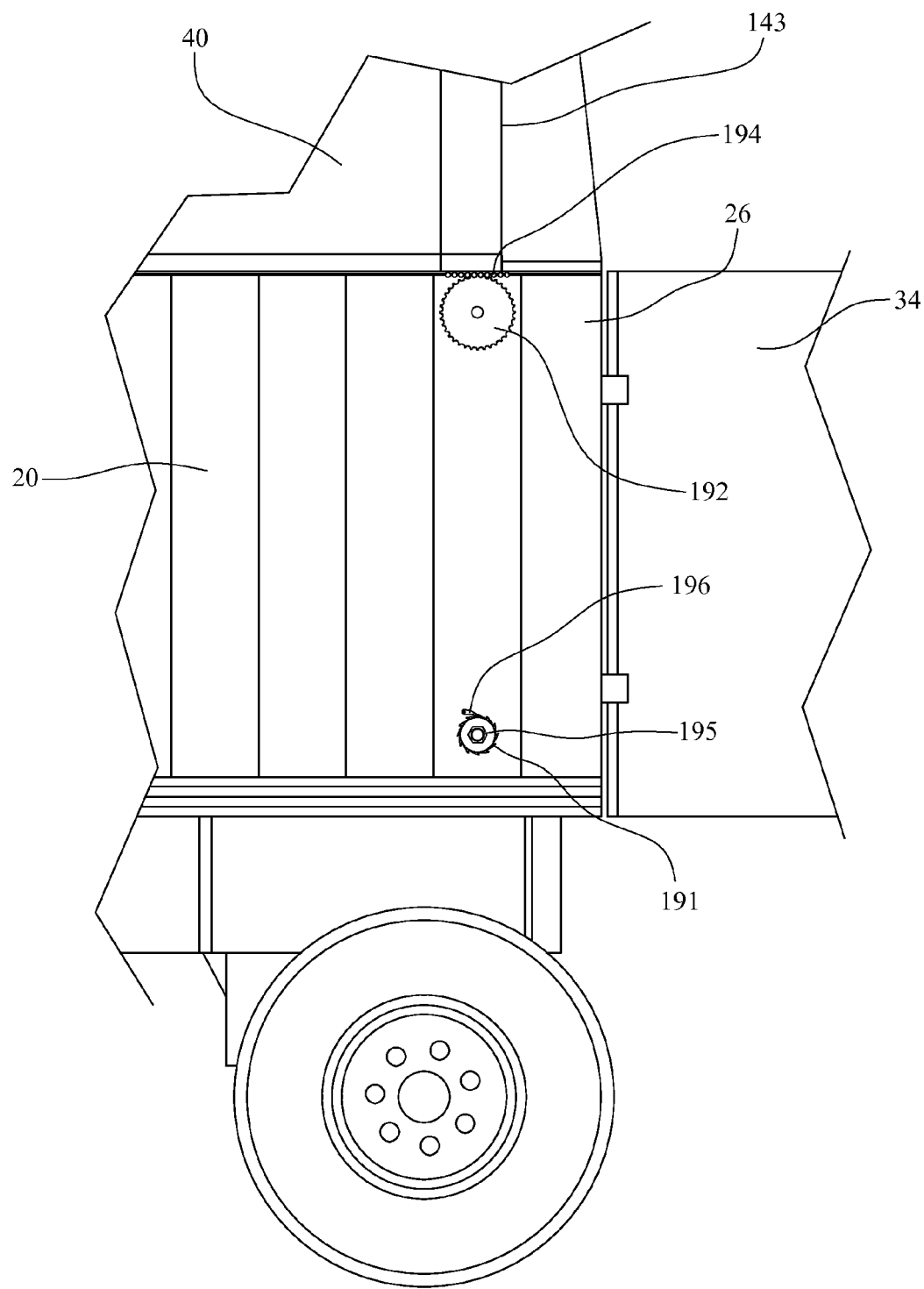
FIG. 12 is a partial side view of the back portion of the rear self-discharge trailer of FIG. 1, and showing an exemplary means for securing the rear section of the enclosure system to the back portion of the rear self-discharge trailer.

As shown in FIGS. 1-3 and in FIG. 12, the combination trailer 10 further includes a tailgate 34 that extends to a height that is substantially equal to the height of the side panels 28, 30 of the rear self-discharge trailer 20. The tailgate 34 is pivotally connected to at least one of the side panels 28, 30 such that the tailgate 34 can rotate outward and away from the combination trailer 10.

Figure 11:
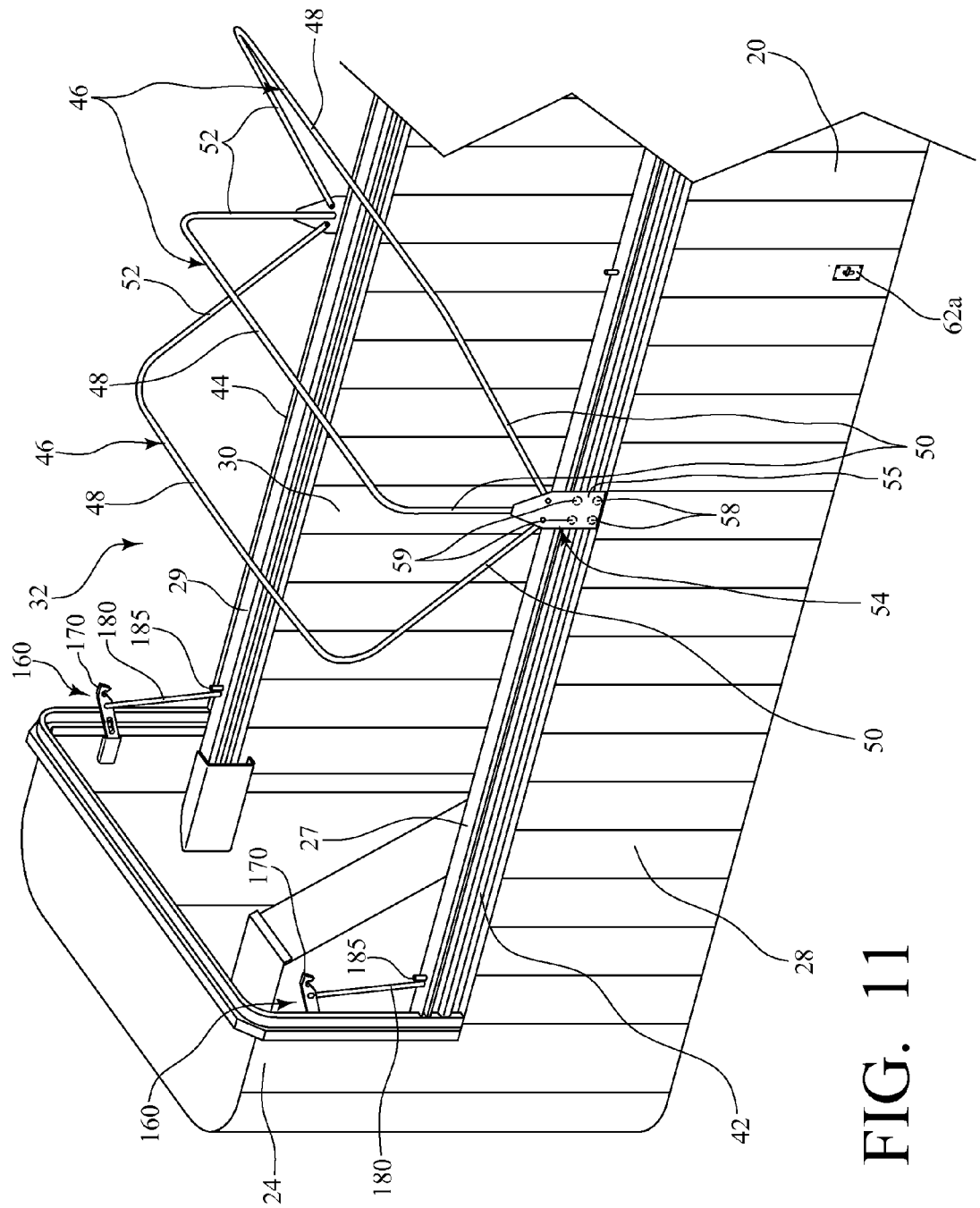
FIG. 11 is a partial perspective view of the exemplary combination trailer of FIG. 1, but showing the enclosure system pulled away from the front portion of trailer and with the flexible tarp and front section of the enclosure system removed from the enclosure system.

Referring now to FIG. 11, the enclosure system 40 of the combination trailer 10 comprises a pair of longitudinal guide tracks 42, 44, one secured to each of the opposing side panels 28, 30 of the rear self-discharge trailer 20, as well as a plurality of inverted U-shaped members 46 that each include a horizontal portion 48, which is substantially parallel to the bottom surface 22 of the rear self-discharge trailer 20, and a pair of vertical leg portions 50, 52 extending downwardly from the horizontal portion 48 and terminating adjacent to the guide tracks 42, 44, where they are connected to a carrier 54 as described further below. As shown in FIG. 11, the vertical leg portions 50, 52 of the U-shaped members 46 roughly extend from the guide tracks 42, 44 to the top of the front portion 24 of the rear self-discharge trailer 20. As such, when the enclosure system 40 is in a fully-expanded condition, the top of the enclosure system 40 is continuous (i.e., substantially level) with the front portion 24 of the rear self-discharge trailer 20, as shown in FIG. 1.

Referring again to FIGS. 1-3, a flexible tarp 56 is also included in the enclosure system 40 and extends over the plurality of U-shaped members 46 such that the tarp can be used to cover the open top 32 of the rear self-discharge trailer 20. In other words, the U-shaped members 46 serve as a frame for the flexible tarp 56. In some embodiments of the enclosure system 40, the flexible tarp 56 includes a rear door cover 57 that extends from the top of the enclosure system 40 to the top of the tailgate 34, and can thus be used with the tailgate 34 to fully enclose the back of the combination trailer 10. The rear door cover 57 can be held down over the rear of the combination trailer 10 by using a strap or another similar fastening means as would be recognized by those of ordinary skill in the art. Additionally, as would also be recognized by those of ordinary skill in the art, the rear door cover 57 can also be rolled up and secured in a rolled-up position with a strap or other similar fastening means to provide access to the interior of the combination trailer 10.

Referring once again to FIG. 11, the enclosure system 40 further includes carriers as a means for connecting the vertical leg portions 50, 52 to the longitudinal guide tracks 42, 44. Each carrier 54 for connecting the vertical leg portions 50, 52 is typically adapted for sliding movement relative to the guide tracks 42, 44. Such a carrier 54 is described, for example, in U.S. Pat. No. 4,711,484, which is incorporated herein by this reference and describes a similar enclosure system for flat bed trailers, as opposed to rear self-discharge trailers. In this regard, each carrier 54 is, in some embodiments, comprised of a carrier plate 55 that includes a pair of upper wheels 59 and a pair of lower wheels 58 such that each carrier 54 slides along the guide tracks 42, 44. Of course, other features can be incorporated into the exemplary carrier 54 for connecting the vertical leg portions 50, 52 to the guide tracks 42, 44 or another similar means can be used to slide the U-shaped members 46 and the tarp 56 along the guide tracks 42, 44 without departing from the spirit and scope of the subject matter described herein.

Regardless of the particular means for connecting the vertical leg portions 50, 52 to the longitudinal guide tracks 42, 44, however, the carrier 54 is designed to allow the U-shaped members 46 of the enclosure system 40 to be displaced between an expanded condition and a collapsed condition. By including an enclosure system 40 in the exemplary combination trailer 10, the enclosure system 40, including the flexible tarp 56, can be used to cover the entire open top of the rear self-discharge trailer 20 (i.e., where the enclosure system 40 is in a fully-expanded condition) or can be used to cover only a portion of the rear self-discharge trailer 20 while it is being loaded or unloaded. For example, in some embodiments, the enclosure system 40 can be collapsed such that the flexible tarp 56 is contracted and is located either adjacent to the front portion 24 of the rear self-discharge trailer 20 or the back portion 26 of the rear self-discharge trailer 20, as shown in FIGS. 2 and 3, respectively. As another example, in some embodiments, the enclosure system 40 can be in a collapsed position such that it only covers a middle portion of the open top 32 of the rear self-discharge trailer 20, and can thus advantageously be used in a manner that allows a portion of the rear self-discharge trailer 20 to be uncovered for loading and/or unloading, while allowing loading and/or unloading to occur in another portion of the rear self-discharge trailer 20 or allowing certain loads to remain covered.

Referring now to FIGS. 1-3, as noted above, the combination trailer 10 further includes one or more locking pin assemblies 62a, 62b, 62c that are attached to the side panels 28, 30 of the rear self-discharge trailer 20 and are used to secure the enclosure system 40 in a desired position. In some embodiments, the plurality of locking pin assemblies include: a pair of locking pin assemblies attached to a front end of each side panel 28, 30; a pair of locking pin assemblies attached to a back end of each side panel 28, 30; and one or more locking pin assemblies along the length of one side panel 28. By attaching the one or more locking pin assemblies 62a, 62b along the length of one side panel 28, a vehicle operator can readily access the enclosure system 40 and place it in a desired position as the locking pin assemblies 62a, 62b would preferably be located on the driver's side of the vehicle. Of course, the locking pin assemblies can also be positioned on other sides or portions of the trailer without departing from the spirit and scope of the subject matter described herein.

As a refinement to the combination trailer 10, and referring now to FIGS. 2-3 and 4-5, the locking pin assemblies 62a, 62b, 62c can be incorporated into the side panels 28, 30 of the rear self-discharge trailer 20 such that the majority of the locking pin assembly is enclosed within a hollow cavity of the side panels 28, 30. In these embodiments, only the handle 75 and a portion of the locking pin 70, are visible and accessible along the side panels 28, 30.

Figure 4:
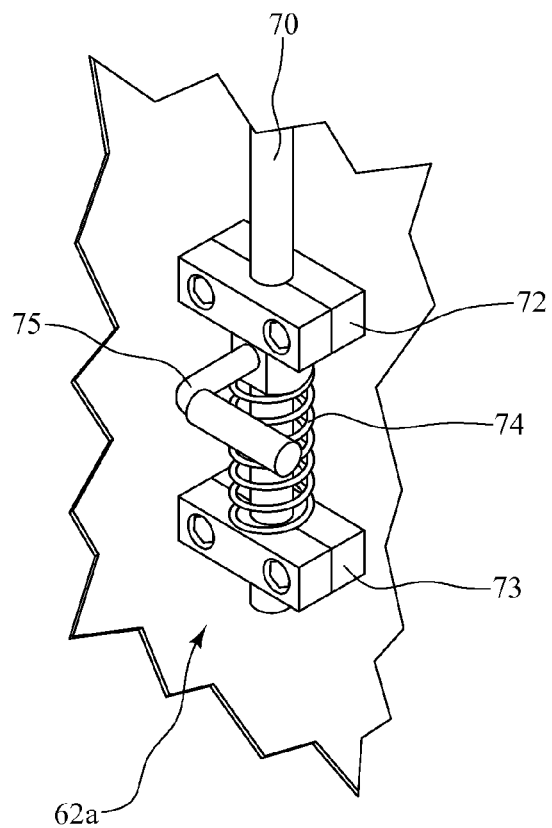
FIG. 4 is a perspective view of an exemplary locking pin assembly for use with the exemplary combination trailer of FIG. 1, but with a portion of the side panel removed to show the bearing blocks, locking pin, and spring of the locking pin assembly.
Figure 5:
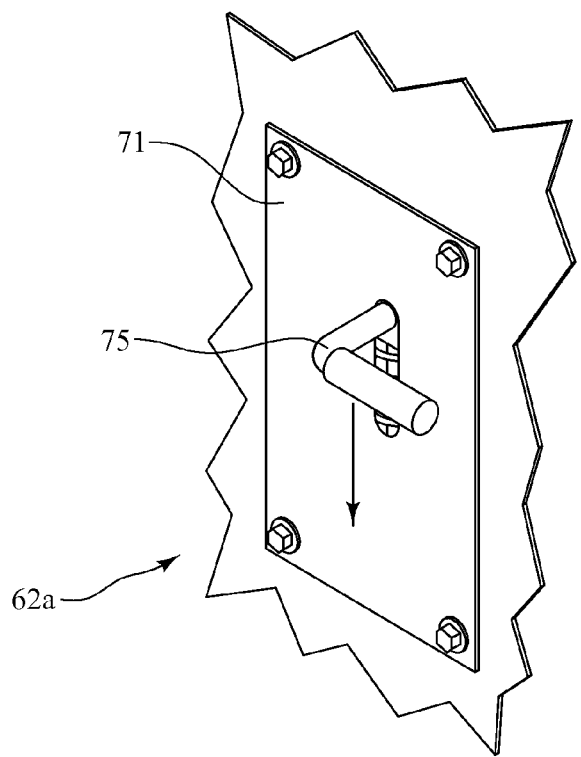
FIG. 5 is another perspective view of the exemplary locking pin assembly of FIG. 4, but showing a plate covering the bearing blocks, locking pin, and spring of the locking pin assembly.

Referring now to FIGS. 4-5, each locking pin assembly 62a typically includes a first bearing block 72 and a second bearing block 73 that secure the locking pin 70 within one of the side panels 28, 30 (as shown in FIGS. 1-3). A spring 74 also surrounds the locking pin 70 and is positioned between the first bearing block 72 and a handle 75. The handle 75 is further attached to the locking pin 70 and is positioned between the spring 74 and the second bearing block 73. Moving the handle 75 downward compresses the spring 74 and moves the locking pin 70 in a downward direction. As such, when an operator wishes to lock the enclosure system 40 in a desired position on the rear self-discharge trailer 20, the operator can first manually pull the enclosure system 40, or a strap 41 connected to the enclosure system 40 (as shown in FIG. 3), such that enclosure system 40 is collapsed to the location of the locking pin assembly 62a. The handle 75 is then pressed downward to pull the locking pin 70 in a downward direction, while at the same time sliding the end of the enclosure system 40 over the locking pin 70. To lock the enclosure system 40 in place, the handle 75 can then be released such that the locking pin 70 extends upward and blocks the enclosure system 40 from sliding further.

Figure 6:
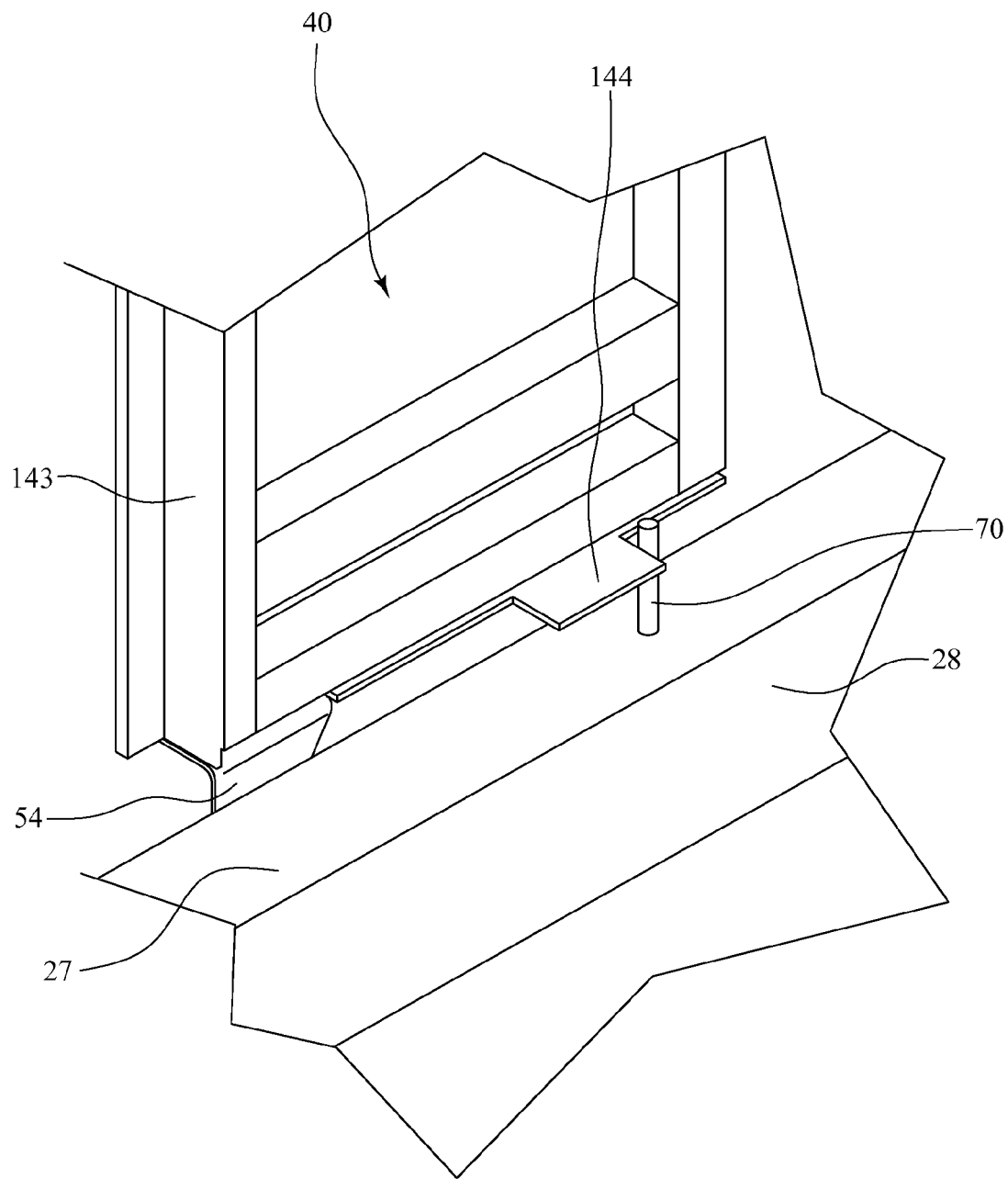
FIG. 6 is a partial perspective view of the interior of the exemplary combination trailer of FIG. 1, and showing the locking pin of the locking pin assembly engaging one of the blocking plates of the enclosure system.

As shown in FIG. 6, when the locking pin 70 is fully extended upward through the top surface 27 of the side panel 28, the enclosure system 40 is prevented from sliding by a blocking plate 144 that is attached to the enclosure system 40 and that engages the locking pin 70 to thereby prevent the enclosure system 40 from sliding further. In FIG. 6, the blocking plate 144 is included in the rear section 143 of the enclosure system 40 to prevent the movement of the enclosure system 40 that may occur when the enclosure system 40 is fully extended over the open top 32 of the rear self-discharge trailer 20 (i.e., when there is tension in the enclosure system 40 due to the enclosure system 40 being in a fully expanded position). Of course, it is also contemplated that a number of additional blocking plates 144 could be positioned along the length of the enclosure system 40 such that the blocking plates 144 can contact the locking pins 70 at various locations along the length of the combination trailer 10 and thereby secure the enclosure system 40 at various positions.

Referring now to FIGS. 7 and 8, to secure the enclosure system 40 to the front portion 24 of the rear self-discharge trailer 20, the combination trailer 10 further includes a pair of latch assemblies 160 (only one of which is shown in FIGS. 7 and 8) that are attached to the front portion 24 of the rear self-discharge trailer 20. In this embodiment, the latch assemblies 160 include: a pair of brackets 164 for securing the latch assembly 160 to the front portion 24 of the rear self-discharge trailer 20; a rod 165 having a lower portion 166 that extends through the bottom surface 22 of the rear self-discharge trailer 20 and an upper portion 167 that is received by the brackets 164; a hooked arm 170 that defines a central eyelet 172; a pin 174 that is positioned in the front portion 24 of the rear self-discharge trailer 20 and passes through the central eyelet 172 of the hooked arm 170 to pivotally connect the hooked arm 170 to the front portion 24; a strap 176 that extends between and connects the upper portion 167 of the rod 165 to the hooked arm 170; and a ratchet 178 that is connected to the lower portion 166 of the rod 165.

In operation, when the front section 142 of the enclosure system 40 is to be secured to the front portion 24 of the rear self-discharge trailer 20, an operator first manually pulls the front section 142 of the enclosure system 40 in close proximity with the front portion 24 of the rear self-discharge trailer 20 such that the hooked arm 170 is centered over an attachment pin 141 positioned in an interior wall of the front section 142 of the enclosure system 40. Then, the operator manually cranks the ratchet 178 which, in turn, rotates the rod 165 such that the strap 176 winds around the rod 165, and the hooked arm 170 is pulled toward the rod 165 and engages the attachment pin 141 in the front section 142 of the enclosure system 40, thereby securing the enclosure system 40 to the front portion 24 of the rear self-discharge trailer 20. In some embodiments, a gasket (not shown) can be included on the front portion 24 of the rear self-discharge trailer 20 to provide a seal between the rear self-discharge trailer 20 and the enclosure system 40. Additionally, to prevent the enclosure system 40 from moving away from the front portion 24 of the rear self-discharge trailer 20 (e.g., due to the tension that is created in the enclosure system 40 as a result of fully extending the enclosure system 40), a pawl 179 is included in the ratchet 178.

In some embodiments, and referring now to FIGS. 7-8 and to FIG. 11, to facilitate the release of the front section 142 of the enclosure system 40 from the front portion 24 of the rear self-discharge trailer 20, each latch assembly 160 further comprises: a sliding rod-like member 180 that has a first end 181 that is pivotally connected to the hooked arm 170 and a second end 182 that is adapted for sliding movement along a top surface 27, 29 of one of the side panels 28, 30 of the rear self-discharge trailer 20. Each latch assembly 160 further includes a stop block 185 that is positioned on the top surface 27, 29 of each of the side panels 28, 30 of the rear self-discharge trailer 20. In these embodiments, to release the front section 142 of the enclosure system 40 from the front portion 24 of the self-discharge trailer 20, an operator first releases the pawl 179 of the ratchet 178. This release of the pawl 179 immediately releases the tension in the strap 176 and allows the strap 176 to begin to unwind from the rod 165. The operator of the combination trailer 10 then manually begins to pull the front section 142 of the enclosure system 40 away from the front portion 24 of the rear self-discharge trailer 20. As the operator manually pulls the front section 142 away from the front portion 24 of the rear self-discharge trailer 20, the sliding rod-like member 180 slides along a top surface 27, 29 of one of the side panels 28, 30 until its second end 182 contacts the stop block 185. Upon contact with the stop block 185, the sliding rod-like member 180 rotates about its second end 182, forcing the hooked arm 170 to move in an upward direction and disengage the hooked arm 170 from the front section 142 of the enclosure system 40.

Referring now to FIGS. 9 and 10, in an alternative embodiment, the front section 242 of the enclosure system 240 is secured to and released from the front portion 224 of the rear self-discharge trailer 220 by a latch assembly 260 that, instead of making use of a sliding rod-like member and a stop block (as in FIGS. 7 and 8), makes use of an uplift arm 210 that is connected to a handle 212. In such an embodiment, each latch assembly 260 still includes a pair of brackets 264 for securing the latch assembly 260 to the front portion 224 of the rear self-discharge trailer 220; a rod 265 having a lower portion 266 that extends through the bottom surface 222 of the rear self-discharge trailer 220 and an upper portion 267 that is received by the brackets 264; a hooked arm 270 that defines a central eyelet 272; a pin 274 that is positioned in the front portion 224 of the rear self-discharge trailer 220 and passes through the central eyelet 272 of the hooked arm 270 to pivotally connect the hooked arm 270 to the front portion 224; a strap 276 that is connected to the upper portion 267 of the rod 265 and the hooked arm 270; and a ratchet 278 that is connected to the lower portion 266 of the rod 265. However, in place of the sliding rod-like member and stop block (as in FIGS. 7 and 8), the uplift arm 210 is connected to the hooked arm 270, and, via the use of the handle 212, is used to manually move the hooked arm 270 upwards or downwards to secure or release the hooked arm 270 from the attachment pin 241 in the front section 242 of the enclosure system 240, thereby securing the enclosure system 240 to or releasing the enclosure system 240 from the front portion 224 of rear self-discharge trailer 220. Of course, various other means for securing the enclosure system 240 to the front portion 224 of rear self-discharge trailer 220, such as straps, fasteners, and the like, can also be used without departing from the spirit and scope of the subject matter described herein.

Figure 13:
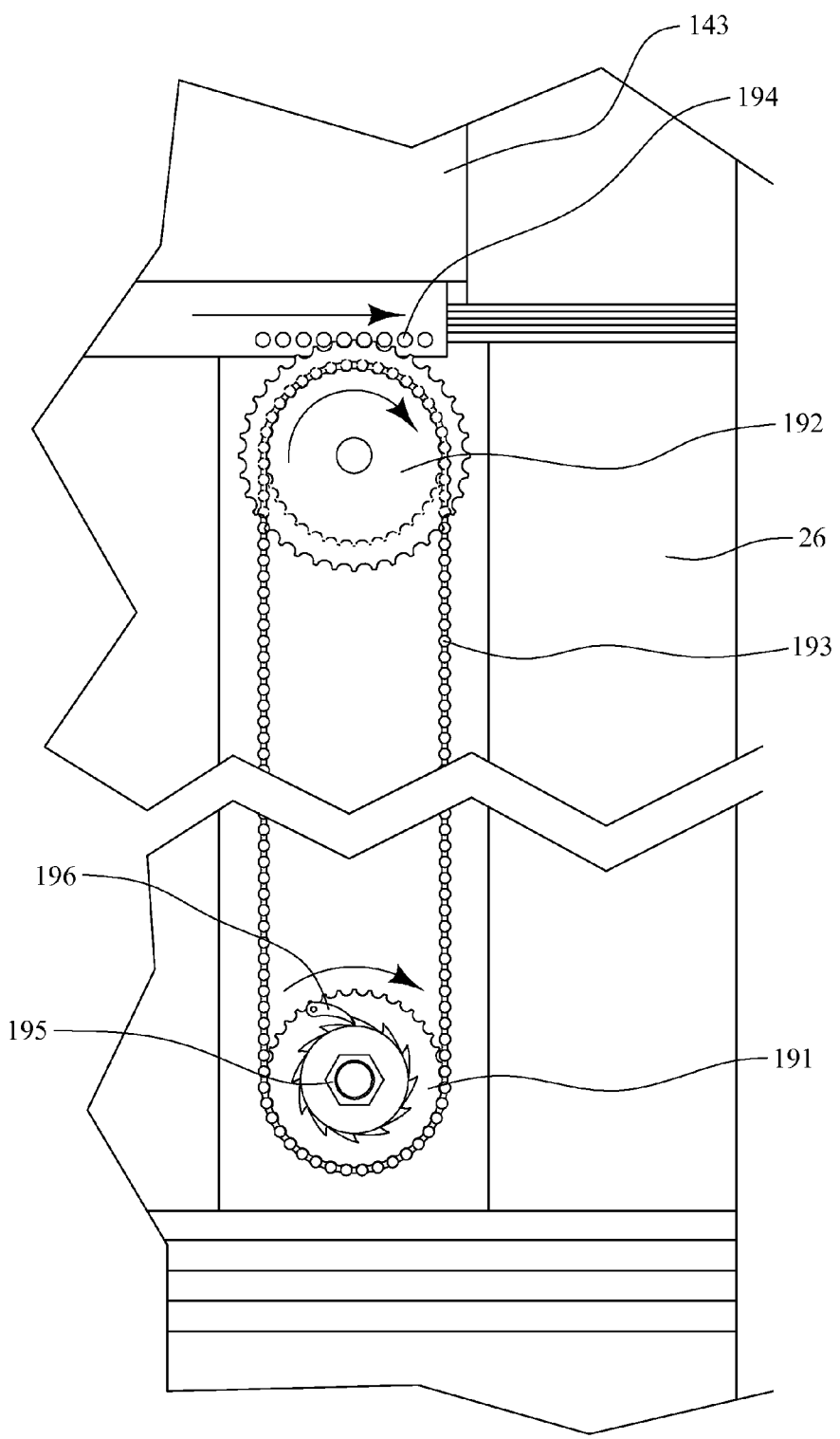
FIG. 13 is a side view of the exemplary means for securing the rear section of the enclosure system of FIG. 12, but with a portion of the side panel of the trailer cut away to show the chain extending around the lower drive sprocket and upper drive pinion.

Referring now to FIGS. 12 and 13, in the exemplary combination trailer 10, means are also provided to secure the rear section 143 of the enclosure system 40 to the back portion 26 of the rear self-discharge trailer 20. In some embodiments, the means for securing the rear section 143 of the enclosure system 40 to the back portion 26 of the rear self-discharge trailer 20 includes a lower drive sprocket 191; an upper driven pinion 192; a chain 193 extending around the lower drive sprocket 191 and the upper driven pinion 192; and a rack 194 secured to the rear section 143 of the enclosure system 40. Upon placement of the rack 194 adjacent to the pinion 192, rotating the lower drive sprocket 191 causes a rotation of the upper drive pinion 192, and thus moves the rack 194 laterally to thereby close and secure the rear section 143 of the enclosure system to the back portion 26 of the rear self-discharge trailer 20. The lower drive sprocket 191 can be rotated using a wrench or another similar tool that is capable of being attached to the lower drive sprocket 191. As a further refinement, in this embodiment, the lower drive sprocket 191 includes a ratchet 195 for rotating the lower drive sprocket 191, and also includes a pawl 196 that prevents the enclosure system 40 from moving away from the back portion 26 of the rear self-discharge trailer 20 (e.g., due to tension in the enclosure system 40) as the rear section 143 of the enclosure system 40 is being secured to the back portion 26 of the rear self-discharge trailer 20.

Figure 14:
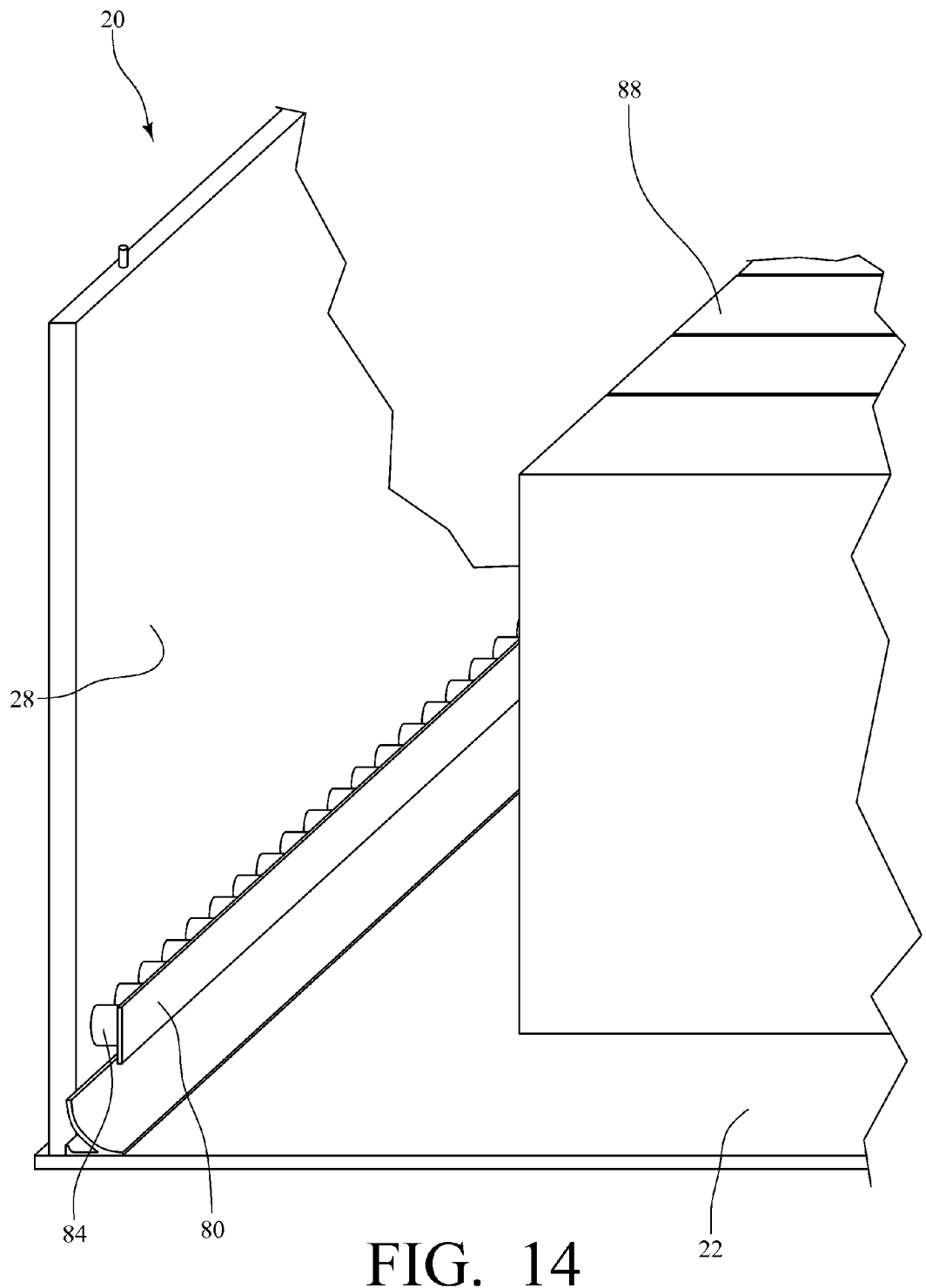
FIG. 14 is a partial perspective view of the interior of the exemplary combination trailer of FIG. 1, and showing the internal rail connected to the side panel by a plurality of posts.

As further refinements, an exemplary combination trailer 10 of the present invention can include a number of features that are positioned in the interior of the rear self-discharge trailer 20. For example, and referring now to FIGS. 14-15, the combination trailer 10 is also equipped with a pair of internal rails 80, 82 that are positioned on the bottom surface 22 of the rear self-discharge trailer 20. The internal rails 80, 82 are connected to the opposing side panels 28, 30 of the rear self-discharge trailer 20 by a plurality of posts 84, where each of the posts 84 are spaced at a predetermined distance from adjacent posts 84. By including the internal rails 80, 82 in the rear self-discharge trailer 20, the internal rails 80, 82 not only provide protection for the side panels 28, 30 of the rear self-discharge trailer 20 when a load of commodities is placed on the bottom surface 22 of the rear self-discharge trailer 20, but the internal rails 80, 82 also provide a means to secure a load within the rear self-discharge trailer 20, as described in further detail below.

Figure 15:
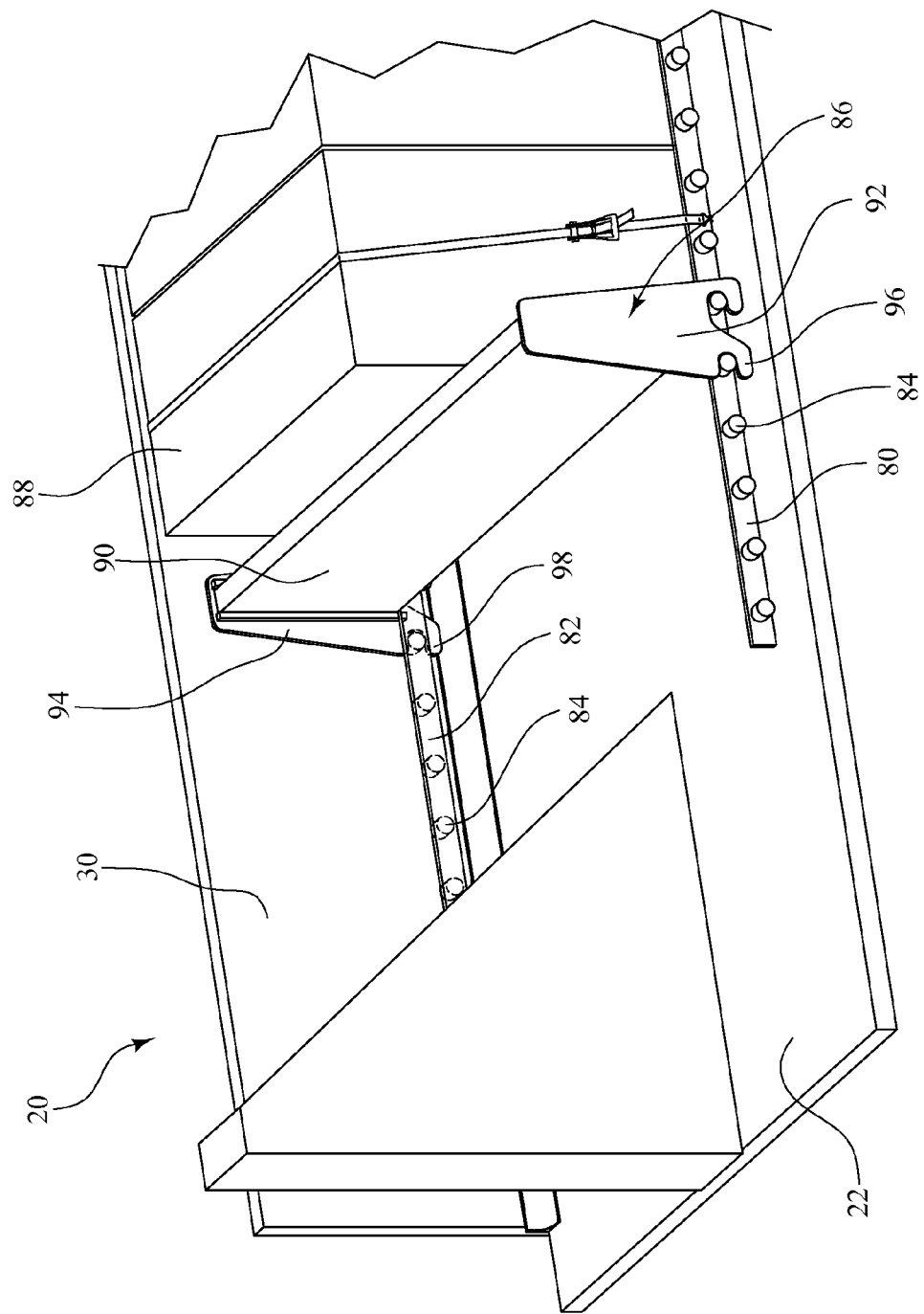
FIG. 15 is a partial perspective view of the exemplary combination trailer of FIG. 1, but with the front portion and one side panel removed to show the adjustable bulkhead positioned in the trailer in front of a load.

As shown in FIG. 15, in one exemplary embodiment, the combination trailer 10 further includes an adjustable bulkhead 86 for securing a load in the rear self-discharge trailer 20. The adjustable bulkhead 86 includes a center panel 90 that is secured between two opposing side members 92, 94. The opposing side members 92, 94 have a hooked bottom portion 96, 98 that can be slidably disposed over the posts 84 connecting the internal rails 80, 82 to the side panels 28, 30 of the rear self-discharge trailer 20, such that the adjustable bulkhead 86 can be positioned at a desired location in the rear self-discharge trailer 20 and used to secure a load 88. In some embodiments, the combination trailer 10 can further include a storage cabinet for storing the adjustable bulkhead 86 when it is not in use.

The above-described combination trailer, which includes a rear self-discharge trailer, an enclosure system, and locking pin assemblies, thus provides a greater deal of flexibility in transporting commodities as the combination trailer can advantageously be used to transport both bulk and general commodities. As such, the combination trailer is expected to reduce mileage incurred without transporting a load, reduce operating expenses, and reduce exhaust emissions, and will thus substantially lower shipping costs while providing faster service to an end user.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A combination trailer, comprising:
a rear self-discharge trailer having a bottom surface, a front portion, a back portion, and two opposing side panels, the side panels having a height that is less than the height of the front portion;
an enclosure system adapted to selectively cover an open top of the rear self-discharge trailer;
at least one locking pin assembly attached to one of the side panels of the rear self-discharge trailer, the locking pin assembly for securing the enclosure system in a desired position;
a pair of internal rails positioned on the bottom surface of the rear self-discharge trailer and connected to the opposing side panels of the rear self-discharge trailer by a plurality of posts, each of the posts spaced at a predetermined distance from each adjacent post; and
an adjustable bulkhead for securing a load in the rear self-discharge trailer, the adjustable bulkhead including a center panel secured between two opposing side members, the side members having a hooked bottom portion adapted to be slidably disposed over the posts such that the adjustable bulkhead can be positioned at a desired location in the rear self-discharge trailer.

2. The combination trailer of claim 1, wherein the enclosure system comprises:
a pair of longitudinal guide tracks secured to the opposing side panels of the rear self-discharge trailer;
a plurality of inverted U-shaped members, each U-shaped member having a horizontal portion that is substantially parallel to the bottom surface of the rear self-discharge trailer and a pair of vertical leg portions extending downwardly from the horizontal portion and terminating adjacent to the guide tracks;
a carrier for connecting the vertical leg portions to the longitudinal guide tracks; and
a flexible tarp extending over the plurality of inverted U-shaped members.

3. The combination trailer of claim 2, wherein the carrier for connecting the vertical leg portions of the U-shaped members to the longitudinal guide tracks is adapted for sliding movement relative to the guide tracks such that the U-shaped members are capable of being displaced between an expanded condition and a collapsed condition.

4. The combination trailer of claim 1, wherein the height of the opposing side panels is about one-half of the height of the front portion of the rear self-discharge trailer.

5. The combination trailer of claim 1, wherein the back portion of the rear self-discharge trailer includes a tailgate extending to a height that is substantially equal to the height of the opposing side panels of the rear self-discharge trailer, and wherein the tailgate is pivotally connected to at least one of the side panels.

6. The combination trailer of claim 5, wherein a rear section of the enclosure system includes a rear door cover adapted for attachment to the tailgate.

7. The combination trailer of claim 1, including a plurality of locking pin assemblies along the length of at least one of the two opposing side panels.

8. The combination trailer of claim 7, including a pair of locking pin assemblies at a front end of each side panel, a pair of locking pin assemblies at a back end of each side panel, and one or more locking pin assemblies along the length of the at least one of the two opposing side panels.

9. The combination trailer of claim 1, wherein the locking pin assembly comprises:
a locking pin;
a first bearing block and a second bearing block for securing the locking pin to the side panel; and
a spring surrounding the locking pin and positioned between the first bearing block and a handle so as to bias the locking pin into engagement with the enclosure system, the handle being attached to the locking pin and positioned between the spring and the second bearing block such that downward movement of the handle compresses the spring and moves the locking pin in a downward direction to disengage the locking pin from the enclosure system.

10. The combination trailer of claim 1, including a pair of latch assemblies attached to the front portion of the rear self-discharge trailer, each latch assembly comprising:
a bracket for securing the latch assembly to the front portion of the rear self-discharge trailer;
a rod having a lower portion extending through the bottom surface of the rear self-discharge trailer and an upper portion received by the means for securing the latch assembly;
a hooked arm defining a central eyelet;
a pin positioned in the front portion of the rear self-discharge trailer, the pin pivotally connecting to the central eyelet of the hooked arm;
a strap connected to the upper portion of the rod and the hooked arm; and
a ratchet connected to the lower portion of the rod, wherein operation of the ratchet rotates the rod such that the strap winds around the rod and the hooked arm engages an attachment pin in a front section of the enclosure system to thereby secure the enclosure system to the front portion of the rear self-discharge trailer.

11. The combination trailer of claim 10, wherein the ratchet further includes a pawl for preventing movement by the enclosure system away from the front portion of the rear self-discharge trailer.

12. The combination trailer of claim 10, wherein each latch assembly further comprises a sliding rod-like member having a first end attached to the hooked arm and a second end adapted for sliding movement along a top surface of the side panel of the rear self-discharge trailer; and a stop block positioned on the top surface of the side panels of the rear self-discharge trailer such that the sliding rod-like member biases the hooked arm in an upward direction and disengages the hooked arm from the front section of the enclosure system upon contact with the stop block.

13. The combination trailer of claim 10, wherein the hooked arm further defines a front eyelet receiving the strap, and thus connecting the hooked arm to the strap.

14. The combination trailer of claim 1, further comprising a sprocket and pinion for securing a rear section of the enclosure system to the back portion of the rear self-discharge trailer.

15. The combination trailer of claim 1, further comprising a means for securing a rear section of the enclosure system to the back portion of the rear self-discharge trailer, wherein the means for securing the rear section of the enclosure system to the back portion of the rear self-discharge trailer comprises:
a lower drive sprocket;
an upper driven pinion;
a chain extending around the lower drive sprocket and the upper driven pinion; and a rack secured to the rear section of the enclosure system, wherein, upon placement of the rack adjacent to the pinion, rotational movement of the lower drive sprocket rotates the upper drive pinion and moves the rack laterally to thereby close and secure the rear section of the enclosure system to the back portion of the rear self-discharge trailer.

16. The combination trailer of claim 15, wherein the lower drive sprocket includes a ratchet for rotating the lower drive sprocket.

17. The combination trailer of claim 16, wherein the lower drive sprocket further comprises a pawl for preventing movement by the enclosure system away from the back portion of the rear self-discharge trailer.

* * * * *